Patented June 22, 1943

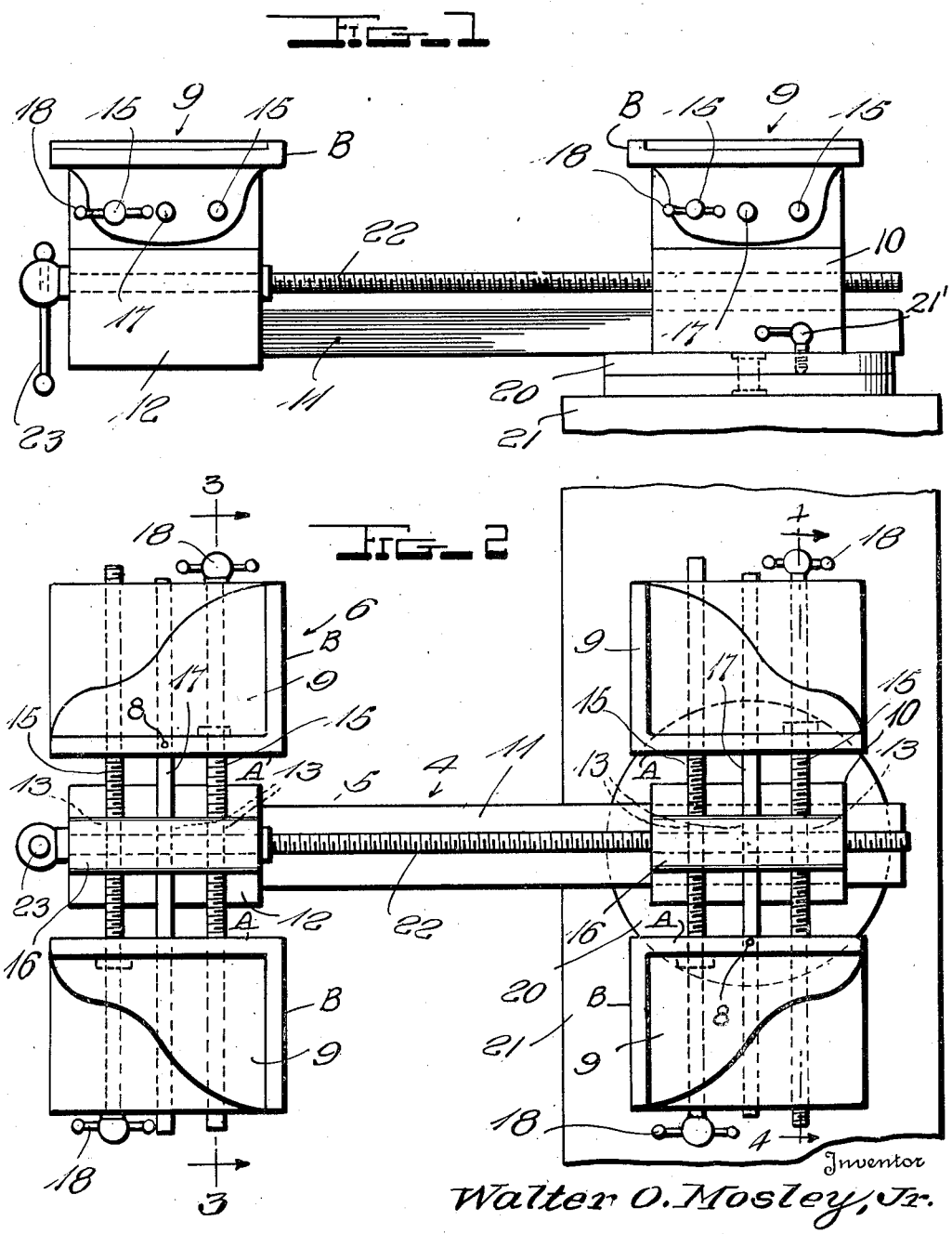

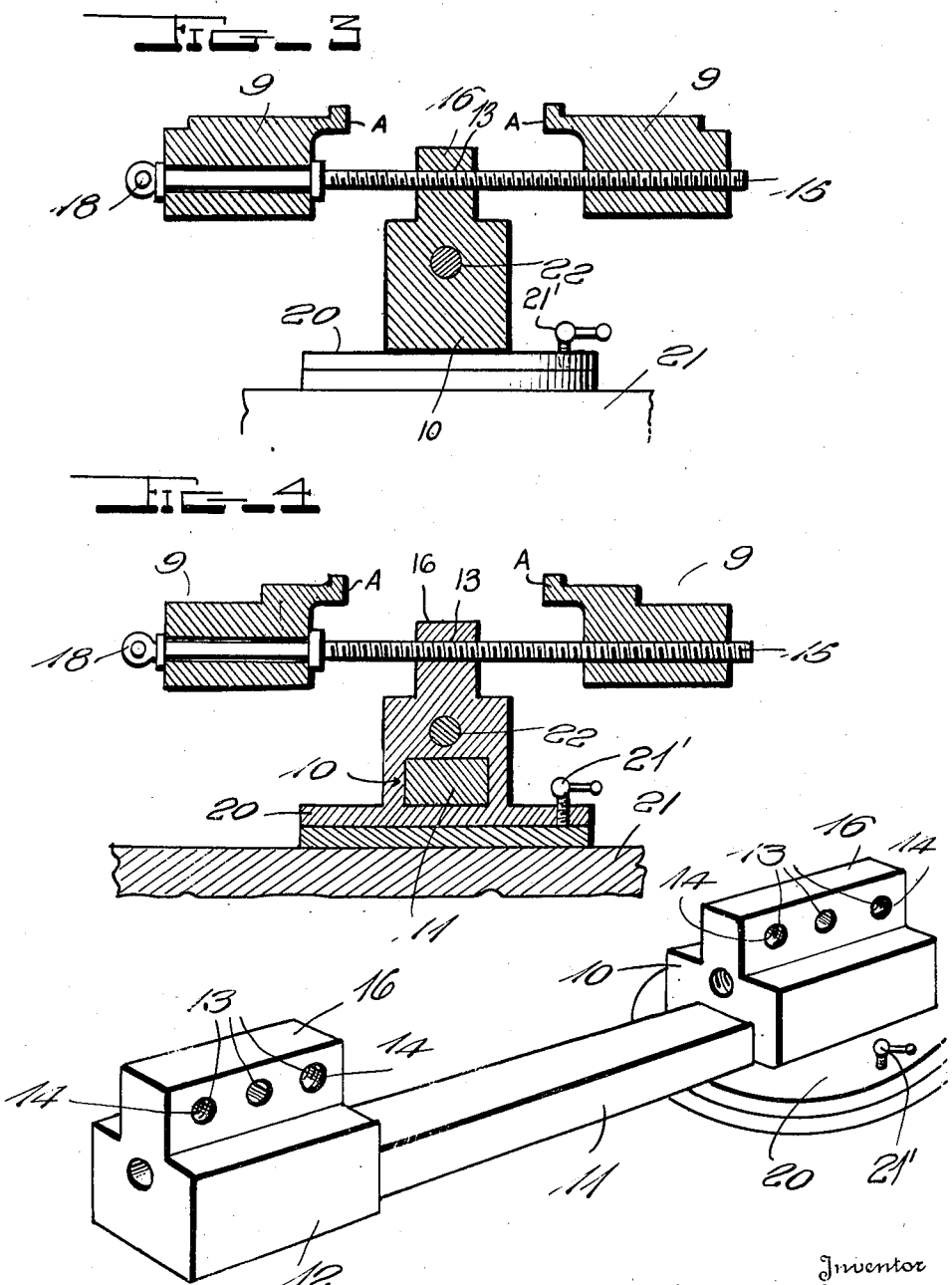

2,322,380

UNITED STATES PATENT OFFICE 2,322,380

VISE

Walter O. Mosley, Jr., North Zulch, Tex.

Application September 11, 1940, Serial No. 356,399

4 Claims. (Cl. 81—33)

My invention relates to vises and has as one of the principal objects thereof the provision of a vise so constructed and arranged whereby the same may be quickly operated to receive objects of a wide variety of sizes and shapes.

An important object of my invention is to provide a device of the character described which is simple in construction, durable in use, efficient in operation and economical in manufacture.

Other objects and advantages will be apparent from the following description, appended claims and annexed drawings.

Referring to the drawings wherein like reference characters designate like parts throughout the several views:

Figure 1 is a side elevation of my invention.

Figure 2 is a top plan view thereof.

Figure 3 is a sectional view taken on the line 3—3 of Figure 2.

Figure 4 is a sectional view taken on the line 4—4 of Figure 2.

Figure 5 is a detail perspective view of the main frame.

Referring in detail to the drawings, an adjustable turntable 20 on a support 21 is employed for supporting the invention for rotation, permitting said invention to be locked against rotation whenever desired, through the use of a conventional securing means 21'.

Formed on the movable part of the turntable 20 is a member 10, provided with a slot to slidably support a horizontally arranged bar 11 having integral therewith a member 12. The members 10 and 12 are provided with reduced elongated portions 16 having groups of openings 13, there being three openings to each group. The end openings of each group of openings are provided with feed threads 14, while the intermediate openings of the group of openings are nonthreaded to freely receive guide rods 17 for the support of vise jaws 9.

The jaws 9 are arranged in pairs, one pair of jaws being carried by the member 10 while the other pair of jaws is carried by the member 12. Each rod 17 is pinned or otherwise secured to one jaw of each pair of jaws, as shown in the drawings at 6 and said rod slides freely through the companion jaw, whereby the jaws of each pair of jaws may be adjusted toward and from each other. Also one pair of jaws may be adjusted toward and from the other pair of jaws which will be hereinafter more fully described.

In order that the jaws of each pair of jaws may be adjusted toward and from each other, reversely disposed and oppositely threaded feed shafts 15 are provided which mesh with the feed threads 14 of the openings 13 and each is journaled in and held against endwise movement in one jaw and freely slidable in the companion jaw thereto, whereby either jaw of each pair of jaws may be adjusted toward and from the other.

The feed shafts 15 cooperate with the rods 17 in slidably supporting the jaws in which they are slidable.

The pairs of jaws are adjustable toward and from each other by a feed shaft 22 which threads in the member 10 and is journaled in and held against endwise movement in the member 12. The feed shaft 22 has a handle 23 for its manual rotation and handles 18 are provided on the feed shafts 15 for the manual rotation thereof.

The jaws operate in a horizontal plane during all of their adjusted positions and may be rotated about a vertical axis by the use of the turntable 20 which is desirable as it will permit the pairs of jaws to be easily brought into a selected position for gripping one or more objects varying as to size and shape.

Each jaw is provided with gripping faces A and B arranged at right angles to each other. The gripping faces A of each pair of jaws oppose each other, while the gripping faces B of one pair of jaws oppose the gripping faces B of the other pair of jaws. Said arrangement of gripping faces, permits objects to be gripped by the gripping faces A of the pair of jaws and another object may be gripped by the faces B of the pair of jaws. Objects thus gripped by the jaws may be brought into engagement one with the other or the objects gripped by the faces A may be easily brought into alignment with each other, or an object may be gripped and held adjacent the ends thereof by the faces A, while a saw is used between the faces B to sever said object, the ends of the object being supported during the sawing operation to prevent binding of the saw in the object as it nears its completion of the cutting operation.

From the foregoing, it will be apparent that the jaws 9 may be adjusted with respect to each other through operation of the shafts 15 thereby permitting objects of a wide variety of sizes and shapes to be securely clamped and held for being operated on.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the claims.

What I claim is:

1. In a vise, a supported member, a second member slidably connected to the first member, pairs of jaws adjustably connected to said members whereby the jaws of each pair of jaws may be adjusted toward and from each other, means for independently adjusting each jaw whereby the jaws of each pair of jaws may be moved toward and from the other, and means for adjusting the members toward and from each other.

2. In a vise, a supported member, a second member slidably connected to the first member, pairs of jaws adjustably connected to said members whereby the jaws of each pair of jaws may be adjusted toward and from each other, means for independently adjusting each jaw whereby the jaws of each pair of jaws may be moved toward and from the other, means for adjusting the members toward and from each other, and gripping faces formed on each jaw and arranged at right angles to each other.

3. In combination with rotatable supporting means including a fastener for the securing of said means against rotation, a member secured to said means whereby said member may be rotated about a vertical axis, a bar slidable in said member, a second member integral with said bar, pairs of jaws adjustably connected to said members whereby the jaws of each pair of jaws may be adjusted toward and from each other, means for adjusting the second member toward and from the first member, and means for independently adjusting each jaw whereby the jaws of each pair of jaws may be moved toward and from the other.

4. In combination with a rotatable supporting means including a fastener for the securing of said means against rotation, a member secured to said means whereby said member may be rotated about a vertical axis, a bar slidable in said member, a second member integral with said bar, pairs of jaws adjustably connected to said members whereby the jaws of each pair of jaws may be adjusted toward and from each other, means for adjusting the second member toward and from the first member, means for independently adjusting each jaw whereby the jaws of each pair of jaws may be moved toward and from the other, and gripping faces formed on each jaw and arranged at right angles to each other.

WALTER O. MOSLEY, Jr.